(12) United States Patent
Clough et al.

(10) Patent No.: US 7,180,621 B2
(45) Date of Patent: Feb. 20, 2007

(54) METHOD AND APPARATUS FOR AUTHORIZING PRINTING

(75) Inventors: James Clough, Boise, ID (US); Darrel Cherry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 10/076,175

(22) Filed: Feb. 13, 2002

(65) Prior Publication Data

US 2003/0151766 A1    Aug. 14, 2003

(51) Int. Cl.
*G06F 15/00*   (2006.01)

(52) U.S. Cl. .................................. 358/1.15; 358/1.14

(58) Field of Classification Search ................. 358/1.5, 358/1.12, 1.13, 1.14, 1.15, 296, 1.9
See application file for complete search history.

(56) References Cited

U.S. PATENT DOCUMENTS

| | | | | |
|---|---|---|---|---|
| 5,555,376 A | * | 9/1996 | Theimer et al. ............ 709/229 |
| 5,579,087 A | * | 11/1996 | Salgado ........................ 399/1 |
| 5,630,079 A | * | 5/1997 | McLaughlin ................. 715/734 |
| 5,978,560 A | * | 11/1999 | Tan et al. ................... 358/1.15 |
| 6,078,406 A | * | 6/2000 | Nickerson ................... 358/468 |
| 6,313,926 B1 | * | 11/2001 | Kumagai et al. ............ 358/442 |
| 6,552,813 B2 | * | 4/2003 | Yacoub ....................... 358/1.1 |
| 6,567,176 B1 | * | 5/2003 | Jeyachandran et al. ..... 358/1.14 |
| 6,859,832 B1 | * | 2/2005 | Gecht et al. ................ 709/224 |
| 6,906,819 B2 | * | 6/2005 | Katsuda et al. ............ 358/1.15 |
| 6,978,299 B1 | * | 12/2005 | Lodwick ..................... 709/223 |

* cited by examiner

*Primary Examiner*—Kimberly Williams
*Assistant Examiner*—Ashish K. Thomas

(57) ABSTRACT

A print job is received (e.g., by a print server) that has an associated print destination. A determination is made as to a first location associated with a source of the print job. Another determination is made regarding a second location associated with the print destination. A printing policy associated with the print job is identified. The print job is communicated to the print destination if the print job satisfies the printing policy. The printing policy may determine whether the first location is the same as the second location. Also, the printing policy may determine whether the first and second locations are located in a common facility (such as a hotel) and whether the second location is in a controlled area of the common facility (such as the front desk).

27 Claims, 6 Drawing Sheets

METHOD AND APPARATUS FOR AUTHORIZING PRINTING

TECHNICAL FIELD

The present invention relates to methods and systems that authorize processing of a print job based on the source of the print job and the destination printing device.

BACKGROUND

Many individuals travel with a portable computing device, such as a laptop computer, a palmtop computer, or a personal digital assistant (PDA). These individuals may desire particular services when traveling. Services of interest to travelers include, for example, a printer in a hotel room or other location that is accessible to an individual when traveling. A printer in a hotel room allows the individual to print documents quickly and confidentially in their own room. The availability of such printing services may cause an individual to select one facility over another.

Knowledge of such services prior to arrival at the facility may simplify the individual's travel plans. For example, if the hotel selected by the individual offers a printer in the reserved hotel room, it is not necessary for the individual to carry a portable printer. Also, the individual can wait to print documents at the hotel rather than trying to print documents before leaving their office.

In a hotel or other facility with multiple printers, it is important to ensure that an individual's print job prints to the proper printer. Sending a print job to the correct printer is necessary to prevent confidential or proprietary information from being viewed by an unauthorized individual. Also, if the facility charges an additional fee for printing, it is important that the print job be charged to the proper individual. Thus, an individual should be prevented from intentionally or inadvertently printing their print job to a printer in a different hotel room or in a different part of the hotel (such as a conference room or the front desk) without prior authorization by the hotel.

One approach to controlling printer access uses a password system to control access to network facilities by a particular individual. For example, when the individual checks-in to a hotel, the hotel issues a username and associated password to the individual. This username allows the individual to access certain hotel network services, as determined by the hotel. However, this approach requires that the individual configure their laptop computer (or other portable computing device) to communicate with the hotel's network. Additionally, the hotel must constantly configure their network server each time an individual checks-in to the hotel and each time an individual checks-out of the hotel. This constant issuing and terminating of individual network accounts can be tedious, time-consuming, and expensive.

The invention described herein addresses these problems by allowing an individual to print a document or other item using a particular printer, such as a printer in the individual's hotel room.

SUMMARY

The systems and methods described herein authorize the processing of a print job based on the location of the source of the print job and the location of the destination printing device. The authorization process applies one or more policies that determine whether a particular print job is communicated to the destination printing device or whether the print job is deleted. The authorization process does not require the use of any special security software on the computer that is the source of the print job. This authorization process may, for example, help prevent a guest in one room of a hotel (or other facility) from printing to a printer located in another room. This policy helps prevent accidental disclosure of information to another user by accidentally printing to the wrong printer. The policy also helps prevent a user from avoiding printing charges imposed by the facility by printing to a printer other than the printer located in the user's room.

In a particular embodiment, a print job is received by a print server such that the print job has an associated print destination. A determination is made regarding a first location associated with a source of the print job. A determination is also made regarding a second location associated with the print destination. At least one printing policy associated with the print job is identified. The print job is communicated to the print destination if the print job satisfies the printing policy.

In a described embodiment, the print job is deleted if the print job does not satisfy the printing policy.

In another embodiment, a print job is received having an associated print destination. A determination is made regarding a first location associated with a source of the received print job. Another determination is made regarding a second location associated with the print destination. The received print job is communicated to the print destination if the first and second locations are in a common facility, and the second location is in a controlled area of the common facility.

Another embodiment receives a print job having an associated print destination. A determination is made regarding a first location associated with a source of the received print job and a determination is made regarding a second location associated with the print destination. The print job is communicated to the print destination if the first location is the same as the second location.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The systems and methods described herein authorize processing of a print job based on the source of the print job and the destination printing device. The systems and methods determine the location of the source of the print job and the location of the destination printing device. Based on these locations, the systems and methods decide whether to authorize processing (e.g., printing) of the print job using the destination printing device. These systems and methods are particularly useful in a facility used by multiple people and/or a facility containing multiple different printing devices. Exemplary facilities include hotels (and other lodging facilities), conference centers, airports, schools, college campuses, and the like.

Figure 1:
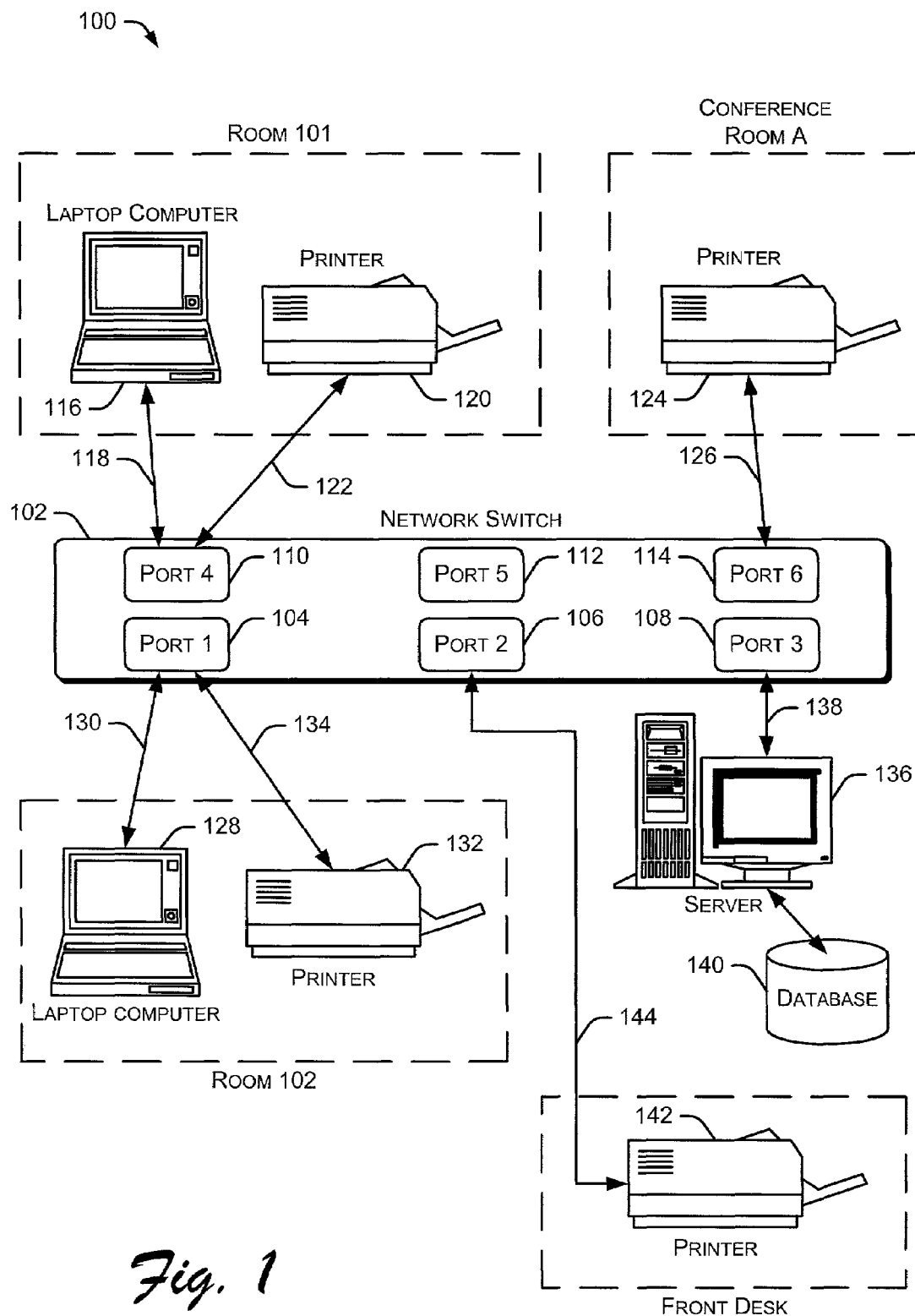
FIG. 1 illustrates a network environment in which the methods and systems described herein may be implemented.

FIG. 1 illustrates a network environment 100 in which the methods and systems described herein may be implemented. In this example, the components shown in FIG. 1 are located within a hotel or similar facility. Network environment 100 includes a network switch 102 having six ports for purposes of illustration. A particular network switch 102 may have any number of ports. In alternate embodiments, network switch 102 may be replaced by any network communication device capable of communicating data between multiple ports (e.g., a hub or a router).

Ports 1–6 on network switch 102 are identified by reference designators 104, 106, 108, 110, 112, and 114, respectively. A laptop computer 116 in a particular hotel room (Room 101) is coupled to port 4 of network switch 102 via a communication link 118. Additionally, a printer 120 located in the same hotel room is coupled to port 4 of network switch 102 via a communication link 122. As discussed below, a guest of Room 101 can use computer 116 to print documents in the privacy of their own room on printer 120.

In an alternate embodiment, computer 116 and printer 120 are coupled to an intermediate device, such as a network hub, which is then coupled to port 4 of the network switch 102. Although a laptop computer 116 is illustrated in FIG. 1, any computing device, such as a desktop computer, a palmtop computer, or a personal digital assistant (PDA), may be coupled to network switch 102.

In another hotel room (Room 102), another computer 128 is coupled to port 1 of network switch 102 via a communication link 130. Additionally, a printer 132 in Room 102 is coupled to port 1 of network switch 102 via a communication link 134. In a hotel conference room (Conference Room A), a printer 124 is coupled to port 6 of network switch 102 via a communication link 126. Another printer 142, located at the hotel's front desk, is coupled to port 2 of network switch 102 via a communication link 144. A server 136 is coupled to port 3 of network switch 102 via a communication link 138. Server 136 is also coupled to a database 140 that stores, for example, information related to the configuration of network environment 100. Server 136 performs various functions, such as monitoring and controlling network activities and printing activities.

Although FIG. 1 shows connections to four areas of a hotel (Room 101, Room 102, Conference Room A, and the front desk), a typical implementation may include computer and printer connections in many hotel rooms and several conference rooms. In a particular implementation, all guest rooms in a hotel or similar facility are equipped with a printer and a connection to a network switch.

The printers illustrated in FIG. 1 are laser printers. However, the methods and systems discussed herein can be applied to any type of printer. A typical printer may include one or more input trays (or input devices) and one or more output trays (or output devices). As used herein, a printer refers to any type of device that can generate an image (e.g., a letter, a picture, a drawing, etc.) on any type of print media, such as paper, cardstock, plastic, or fabric. Example devices include impact printers, non-impact printers, digital copiers, analog copiers, facsimile machines, press machines, silk screen machines, etc. For ease of discussion, printers are discussed herein in the context of printing on paper. A printer may also be referred to herein as a "printing device".

Figure 2:
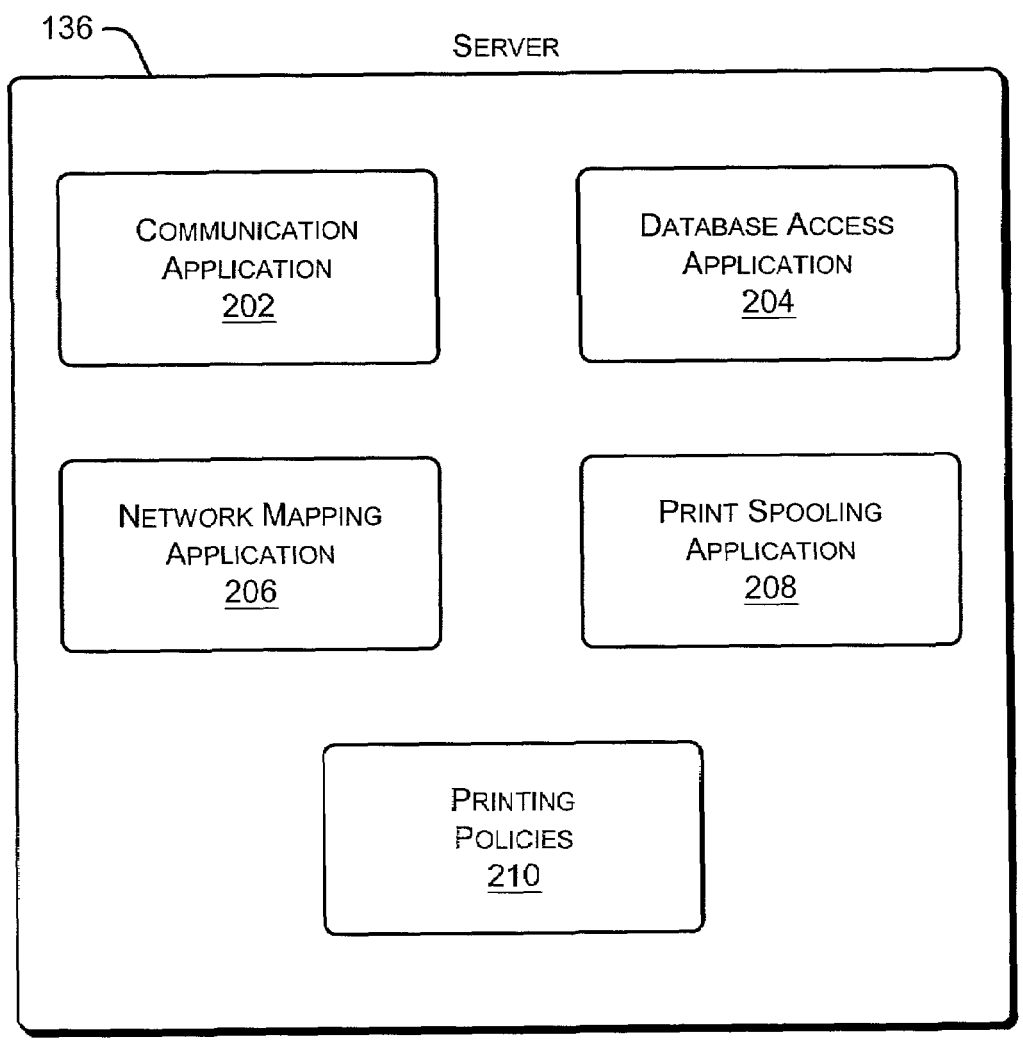
FIG. 2 is a block diagram illustrating pertinent portions of a server contained in the network environment.

FIG. 2 is a block diagram illustrating pertinent portions of server 136 contained in network environment 100. Server 136 includes a communication application 202 that allows the server to communicate with other devices, such as computing devices and printing devices coupled to server 136 via one or more networks. A database access application 204 allows server 136 to store data to a database (e.g., database 140 in FIG. 1) and retrieve data from the database. A network mapping application 206 analyzes one or more networks and generates a map (or diagram) of the network topology, including network hardware (such as network routers, switches, and hubs), network connections, and computing devices (such as computers and printers) coupled to the network.

A print spooling application 208 handles the queuing of print jobs and the distribution of queued print jobs to an appropriate printing device. The print spooling application 208 uses one or more printing policies 210 to determine how print jobs are queued and distributed to printing devices. Printing policies 210 also determine which source and destination ports (e.g., network data ports on the network switch that facilitate network input and output) are permitted to handle print jobs. For example, particular printing policies may define the types of print jobs that can be sent to a particular printing device. Additional details regarding the handling of print jobs are discussed below.

Figure 3:
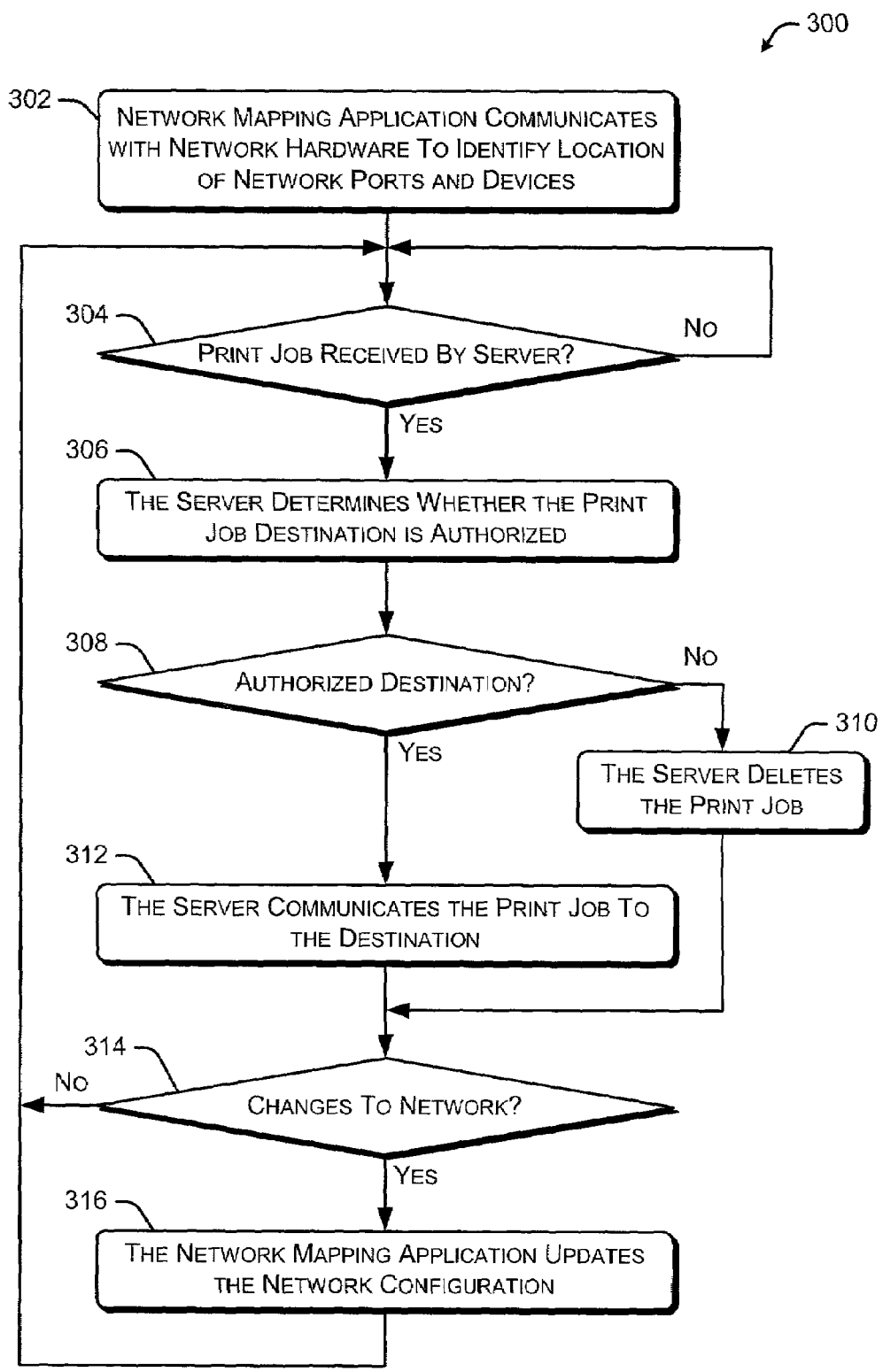
FIG. 3 is a flow diagram illustrating a procedure for identifying a network configuration and authorizing print jobs.

FIG. 3 is a flow diagram illustrating a procedure 300 for identifying a network configuration and authorizing print jobs. Initially, a network mapping application (such as application 206 in FIG. 2) communicates with various network hardware to identify the location of network ports and network devices (block 302). The information identified by the network mapping application is stored, for example, in a database.

The network configuration may be discovered automatically or may be entered manually (for example, by a network administrator or other network operator). After the network configuration has been identified, a protocol such as Simple Network Management Protocol (SNMP) can be used to locate individual devices by querying the network switch.

Next, the procedure 300 determines whether a print job has been received by the server (block 304). If no print job has been received, the procedure continues to watch for a new print job to be received by the server. If a print job has been received by the server, the server determines whether the print job destination (i.e., the destination identified in the print job) is an authorized destination for the particular print job (block 306). This authorization may apply one or more printing policies, and is described below with respect to FIG. 4.

If the print job destination is not an authorized destination for the print job, then the procedure 300 branches to block 310, where the server deletes the print job without sending the print job to the destination. Additionally, the server may send a message to the source of the print job indicating that the print job was canceled and the reason for canceling the print job. If the print job destination is an authorized destination for the print job, then the server communicates the print job to the destination (block 312).

At block 314 of procedure 300, the procedure determines whether there have been any changes to the network, such as the addition of a new network device, the removal of a network device, or the reconfiguration of a network device.

If there are no changes to the network, the procedure returns to block 304 to wait for another print job. If there are one or more changes to the network, the network mapping application updates the network configuration by adding or deleting the changed network devices from the network configuration information stored in the database (block 316). The procedure then returns to block 304 to wait for another print job. The detection of a print job at block 304 may occur independently of the print procedure and/or independently of procedure 300.

Figure 4:
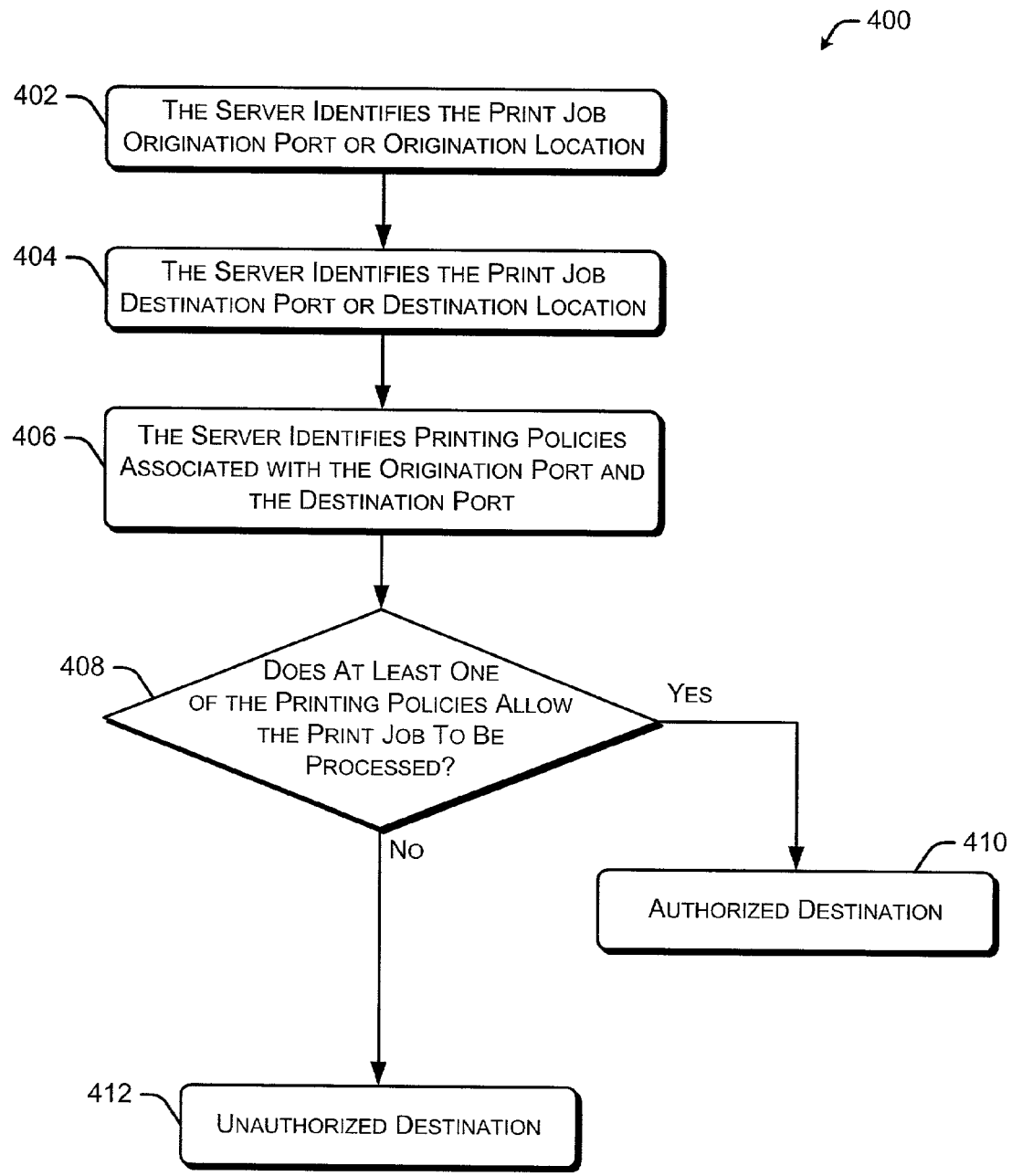
FIG. 4 is a flow diagram illustrating a procedure for determining whether a particular print job is authorized.

FIG. 4 is a flow diagram illustrating a procedure 400 for determining whether a particular print job is authorized to be printed on the desired destination printer. The server initially identifies the print job's origination port (or origination location) (block 402). The print job's origination port is, for example, the network port to which the source of the print job is coupled. In the example of FIG. 1, if the print job is received from laptop computer 116, then the print job's origination port is Port 4 of network switch 102. Alternatively, the print job's origination location may be identified as a particular room in a facility, such as a hotel room. Procedure 400 then continues to block 404, where the server identifies the print job destination port (or destination location). The print job destination port is the port associated with the print device designated in the print job. In the example of FIG. 1, if the print job destination is designated as printer 120, then the print job destination port is Port 4 of network switch 102. In this example, the print job's origination port (Port 4) is the same as the print job destination. Alternatively, the print job's destination location may be identified as a particular room or location in a facility, such as a hotel conference room.

Next, the procedure 400 identifies printing policies associated with the origination port and the destination port (block 406). Various printing policies may be used to control the processing of print jobs. For example, a particular printing policy may specify that print jobs having a common origination port and destination port (or print jobs where the origination port and the destination port are in the same hotel room) are authorized. Alternatively, print jobs originating from a conference participant may be authorized to print on particular printers in a conference room or conference center. Individuals that are not conference participants are not permitted to use the conference-related printers. Similarly, print jobs originating from a college faculty member are authorized to print on certain printers in faculty areas, such as a faculty lounge. In this situation, students and other non-faculty members are not permitted to print on printers in faculty areas.

Next, the procedure determines whether at least one of the printing policies allow the print job to be processed (block 408). If at least one policy authorizes the print job to be processed, the procedure continues to block 410, which authorizes the print job. If none of the policies authorize the print job to be processed, the print job is not authorized (block 412). As discussed above with respect to FIG. 3, if the destination is authorized, then the server communicates the print job to the desired destination. However, if the destination is not authorized, then the server deletes the print job.

Figure 5:
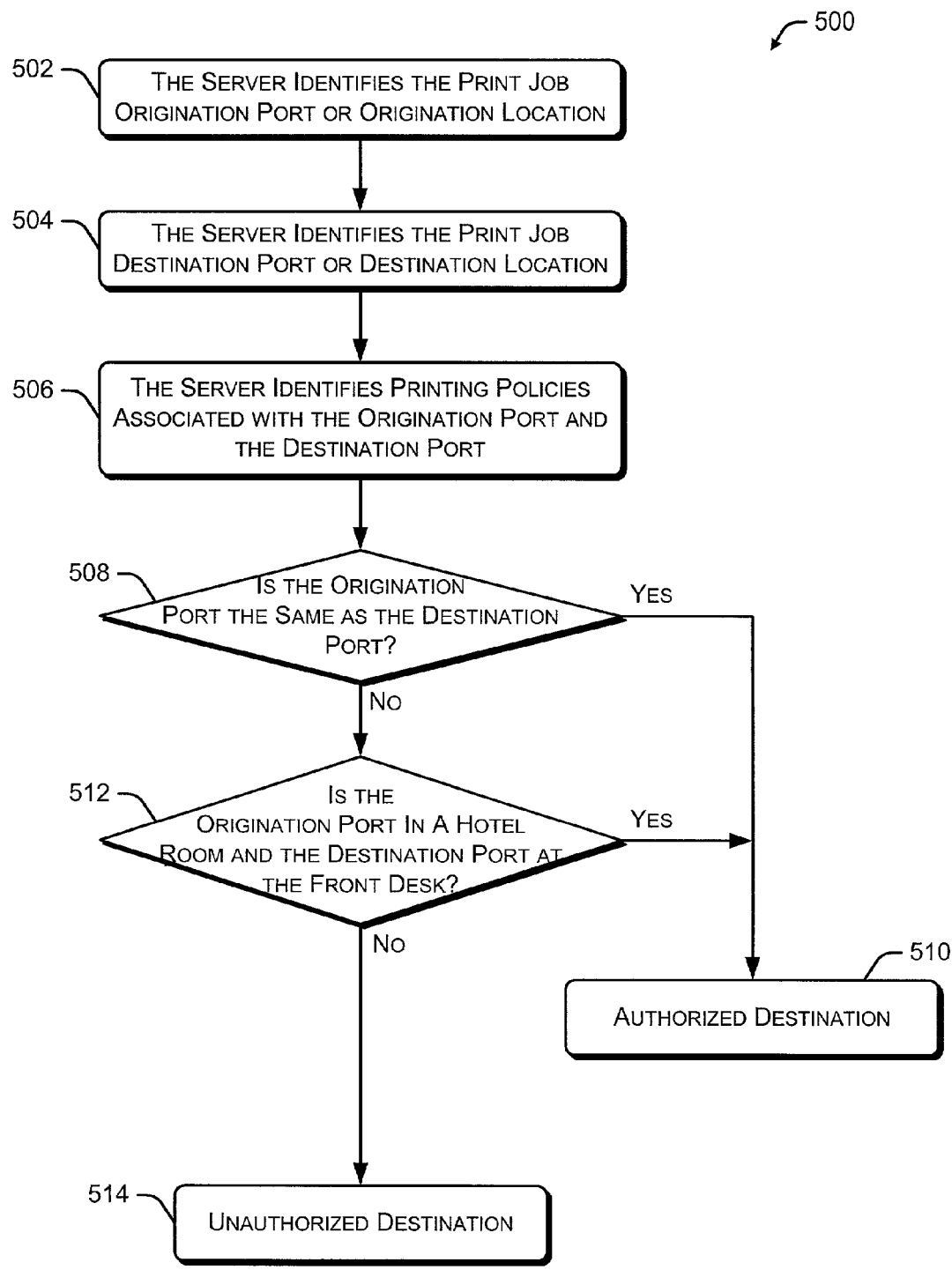
FIG. 5 is a flow diagram illustrating a procedure that applies specific policies to determine whether a particular print job is authorized.

FIG. 5 is a flow diagram illustrating a procedure 500 that applies specific policies to determine whether a particular print job is authorized. The server initially identifies the print job's origination port or origination location (block 502). Next, the server identifies the print job destination port or destination location (block 504). The procedure then identifies printing policies associated with the origination port and the destination port (block 506). In this example, two printing policies are identified. The first printing policy allows a print job to be processed if the print job's origination port (or origination location) is the same as the print job's destination port (or destination location). The second printing policy allows a print job to be processed if the origination port (or origination location) is in a hotel room and the destination port (or destination location) is at the front desk of the hotel. In alternate embodiments, the second printing policy checks to see if the destination port is located in a controlled area (such as a locked office, front desk, or other area of the facility that is not generally accessible to a guest of the hotel).

The first printing policy is applied at block 508, which determines whether the origination port or location is the same as the destination port or location. If so, the procedure branches to block 510, indicating that the print job is authorized. Otherwise, the second printing policy is applied at block 512, which determines whether the origination port or location is in a hotel room and the destination port or location is at the front desk. If so, the print job is authorized (block 510). Otherwise, the print job is not authorized (block 514).

Procedure 500 above applies particular printing policies to print jobs received by the server. In this particular example, the printing policies restrict a printer in a particular hotel room to printing on a printer in the same room or a printer at the front desk. This policy prevents a person in one hotel room from accidentally exposing confidential information by printing a document on a printer in another guest's room. Additionally, if the hotel charges a fee for each print job, this policy prevents a guest in one room from avoiding the print job fee by printing the print job to another room or another location in the hotel (other than the front desk, which has a printer that is monitored by the front desk staff).

The printing policies discussed above represent one possible set of policies for handling print jobs received by a server in a hotel. However, in alternate embodiments, different policies may be utilized. For example, a particular hotel may permit certain guests to print to a printer located in a conference room being used by the guests. Additionally, hotel staff may authorize a particular guest to print to printers in more than one room. In other facilities, other policies may be used to control the handling of print jobs to satisfy requirements or restrictions imposed by the facility.

The printing policies applied to a particular print job may change as the active set of printing policies changes. For example, new printing policies may be created and existing printing policies may be deleted or modified. In one embodiment, the current set of printing policies is identified when processing each print job, such that any printing policy changes become effective with the next print job.

Figure 6:
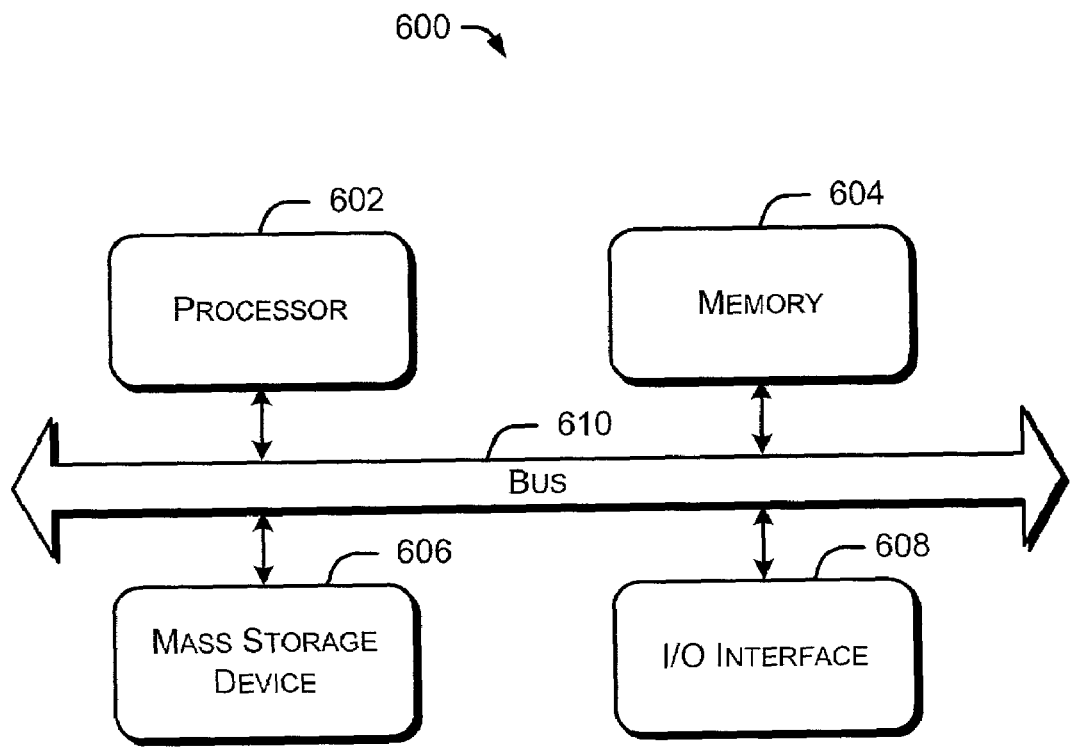
FIG. 6 is a block diagram of a computer system that can be utilized in accordance with one or more embodiments described herein.

FIG. 6 is a block diagram of a computer system 600 that can be utilized in accordance with one or more embodiments described herein. Computer system 600 can be, for example, a laptop computer such as computer 116 or 128 and/or server 136 of FIG. 1. Computer system 600 represents a wide variety of computing devices, such as desktop computers, portable computers, dedicated server computers, multi-processor computing devices, cellular telephones, PDAs, handheld or pen-based computers, microcontroller-based electronic devices, gaming consoles, and so forth.

Computer system 600 includes one or more processors 602, memory 604, a mass storage device 606, and an input/output (I/O) interface 608, all coupled to a bus 610. Bus 610 represents one or more buses in computer system 600, such as a system bus, processor bus, accelerated graphics port (AGP), peripheral component interconnect (PCI), and so forth. The bus architecture can vary by computing device as well as by manufacturer. I/O interface 608 is a conventional interface allowing components of computer system 600 (e.g., processor(s) 602) to communicate with other computing devices, such as via network switch 102 of FIG. 1. I/O interface 608 may be, for example, a modem, a network interface card (NIC), and so forth.

Memory 604 represents volatile and/or nonvolatile memory used to store instructions and data for use by processor 602. Typically, instructions are stored on mass storage device 606 (or nonvolatile memory) and loaded into a volatile memory 604 for execution by processor(s) 602. Additional memory components may also be involved, such as cache memories internal or external to processor 602. Various embodiments can be implemented, at different times, in any of a variety of computer readable media that is part of, or readable by, computer system 600. For example, such computer readable media may be mass storage device 606, memory 604 or a cache memory, a removable disk (not shown) that is accessible by processor 602, or another controller of computer system 600 (such as a magnetic disk or optical disk), and so forth.

Computer system 600 is exemplary only. It is to be appreciated that additional components (not shown) can be included in computer system 600 and some components illustrated in computer system 600 need not be included. For example, a display adapter, additional processors or storage devices, additional I/O interfaces, and so forth may be included in computer system 600, or mass storage device 606 may not be included.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or an application specific integrated circuit (ASIC) could be configured or designed to implement various components and/or processes discussed herein.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
  receiving a print job identifying a print destination;
  determining a first location associated with a source of the print job;
  determining a second location associated with the print destination;
  determining a printing policy of the print job, the printing policy being based on the first location associated with the source of the print job and the second location associated with the print destination, and including determining whether the first and second locations are located in a common facility;
  communicating the print job to the print destination if the print job satisfies the printing policy; and
  deleting the print job if the first and second locations are in different facilities.

2. A method as recited in claim 1 further comprising deleting the print job if the print job does not satisfy the printing policy.

3. A method as recited in claim 1 wherein the printing policy includes determining whether the first location is the same as the second location.

4. A method as recited in claim 1 wherein the printing policy includes determining whether the second location is in a controlled area of the common facility, and further comprising deleting the print job if the second location is in an uncontrolled area of the facility.

5. A method as recited in claim 1 wherein determining a first location includes identifying a communication port associated with the source of the print job.

6. A method as recited in claim 1 wherein determining a second location includes identifying a communication port associated with the print destination.

7. A method as recited in claim 1 wherein the source of the print job and the print destination are located in a common facility.

8. A method as recited in claim 1 wherein the print job is received by a print server.

9. A method as recited in claim 1 wherein the print job destination is a printer.

10. A method comprising:
  receiving a print job having an associated print destination;
  determining a first location associated with a source of the received print job;
  determining a second location associated with the print destination;
  communicating the received print job to the print destination if both the first and second locations are in a common facility, and the second location is in a controlled area of the common facility; and
  deleting the received print job if the first and second locations are in different facilities.

11. A method comprising:
  receiving a print job having an associated print destination;
  determining a first location associated with a source of the received print job;
  determining a second location associated with the print destination;
  communicating the received print job to the print destination if both the first and second locations are in a common facility, and the second location is in a controlled area of the common facility; and
  deleting the received print job if the second location is in an uncontrolled area of the facility.

12. A method as recited in claim 10 wherein the common facility is a hotel.

13. A method as recited in claim 10 wherein the controlled area of the common facility is the front desk of the facility.

14. A method as recited in claim 10 wherein determining a first location includes identifying a first network port associated with the source of the received print job.

15. A method as recited in claim 10 wherein determining a second location includes identifying a second network port associated with the print destination.

16. A server comprising:
  a network mapping application to identify devices coupled to a network;
  at least one printing policy; and
  a processor configured to execute the network mapping application and further configured to apply the at least one printing policy,
  wherein the server receives a print job identifying a print destination and determines a first location associated with a source of the print job and a second location associated with the print destination.

wherein the at least one printing policy is based on the source of the print job and the print destination, and wherein the print job is communicated to the print destination if the print job satisfies the at least one printing policy.

wherein the at least one printing policy includes determining whether the first and second locations are located in a common facility, and wherein the processor is configured to delete the print job if the first and second locations are in different facilities.

17. A server as recited in claim 16 wherein the at least one printing policy further includes determining whether the second location is in a continued area of the common facility, and wherein the processor is further configured to delete the print job if the second location is in an uncontrolled area of the facility.

18. A server comprising:
  a network mapping application to identity devices coupled to a network;
  at least one printing policy; and
  a processor configured to execute the network mapping application and further configured to apply the at least one printing policy,
  wherein the server receives a print job identifying a print destination and determines a first location associated with a source of the print job and a second location associated with the print destination,
  wherein the at least one printing policy is based on the source of the print job and the print destination, and wherein the print job is communicated to the print destination if the print job satisfies the at least one printing policy,
  wherein the at least one printing policy includes determining whether the second location is in a controlled area of a facility, and wherein the processor is configured to delete the print job if the second location is in an uncontrolled area of the facility.

19. A server as recited in claim 18 wherein the at least one printing policy further includes determining whether the first and second locations are located in a common facility, and wherein the processor is further configured to delete the print job if the first and second locations are in different facilities.

20. One or more computer-readable media having stored thereon a computer program that, when executed by one or more processors, causes the one or more processors to:
  receive a print job identifying a print destination;
  determine a first location associated with a source of the print job;
  determine a second location associated with the print destination;
  determine a printing policy of the print job, the printing policy being based on the first location associated with the source of the print job and the second location associated with the print destination; and
  communicate the print job to the print destination if the print job satisfies the printing policy,
  wherein the printing policy includes determining whether the first and second locations are located in a common facility, and wherein the computer program causes the one or more processors to delete the print job if the first and second locations are in different facilities.

21. One or more computer-readable media as recited in claim 20 wherein the printing policy further includes determining whether the second location is in a controlled area of the common facility, and wherein the computer program further causes the one or more processors to delete the print job if the second location is in an uncontrolled area of the facility.

22. One or more computer-readable media having stored thereon a computer program that, when executed by one or more processors, causes the one or more processors to:
  receive a print job identifying a print destination:
  determine, a first location associated with a source of the print job;
  determine a second location associated with the print destination:
  determine a printing policy of the print job, the printing policy being based on the first location associated with the source of the print job and the second location associated with the print destination; and
  communicate the print job to the print destination if the print job satisfies the printing policy,
  wherein the printing policy includes determining whether the second location is in a controlled area of a facility, and wherein the computer program causes the one or more processors to delete the print job if the second location is in an uncontrolled area of the facility.

23. One or more computer-readable media as recited in claim 22 wherein the printing policy further includes determining whether the first and second locations are located in a common facility, and wherein the computer program causes the one or more processors to delete the print job if the first and second locations are in different facilities.

24. A method as recited in claim 11 wherein the common facility is a hotel.

25. A method as recited in claim 11 wherein the controlled area of the common facility is the front desk of the facility.

26. A method as recited in claim 11 wherein determining a first location includes identifying a first network port associated with the source of the received print job.

27. A method as recited in claim 11 wherein determining a second location includes identifying a second network port associated with the print destination.

* * * * *

UNITED STATES PATENT AND TRADEMARK OFFICE
CERTIFICATE OF CORRECTION

PATENT NO. : 7,180,621 B2  Page 1 of 1
APPLICATION NO. : 10/076175
DATED : February 20, 2007
INVENTOR(S) : James Clough et al.

It is certified that error appears in the above-identified patent and that said Letters Patent is hereby corrected as shown below:

In column 9, line 2, in Claim 16, delete "destination." and insert -- destination, --, therefor.

In column 9, line 7, in Claim 16, delete "policy." and insert -- policy, --, therefor.

In column 9, line 15, in Claim 17, delete "continued" and insert -- controlled --, therefor.

In column 9, line 20, in Claim 18, delete "identity" and insert -- identify --, therefor.

In column 10, line 21, in Claim 22, delete "destination:" and insert -- destination; --, therefor.

In column 10, line 22, in Claim 22, after "determine" delete ",".

In column 10, line 25, in Claim 22, delete "destination:" and insert -- destination; --, therefor.

Signed and Sealed this

Fifth Day of May, 2009

JOHN DOLL
*Acting Director of the United States Patent and Trademark Office*